United States Patent
Li et al.

(10) Patent No.: US 10,684,114 B2
(45) Date of Patent: Jun. 16, 2020

(54) SPECKLE MITIGATION

(71) Applicants: IMEC VZW, Leuven (BE); Universiteit Gent, Ghent (BE)

(72) Inventors: YanLu Li, Ghent (BE); Roeland Baets, Deinze (BE); Eva Ryckeboer, Ghent (BE); Jinghao Zhu, Leuven (BE)

(73) Assignees: IMEC VZW, Leuven (BE); Universiteit Gent, Ghent (BE)

( * ) Notice: Subject to any disclaimer, the term of this patent is extended or adjusted under 35 U.S.C. 154(b) by 0 days.

(21) Appl. No.: 16/290,041

(22) Filed: Mar. 1, 2019

(65) Prior Publication Data
US 2019/0271854 A1 Sep. 5, 2019

(30) Foreign Application Priority Data

Mar. 1, 2018 (EP) ..................................... 18159431

(51) Int. Cl.
| | |
|---|---|
| *G01B 9/02* | (2006.01) |
| *G01H 9/00* | (2006.01) |
| *G02B 27/48* | (2006.01) |
| *G01N 21/47* | (2006.01) |
| *G01S 17/58* | (2006.01) |

(52) U.S. Cl.
CPC ......... *G01B 9/02082* (2013.01); *G01H 9/004* (2013.01); *G01N 21/4795* (2013.01); *G01S 17/58* (2013.01); *G02B 27/48* (2013.01); *G01N 2021/479* (2013.01)

(58) Field of Classification Search
CPC ........... G01B 9/02082; G01N 21/4795; G01N 2021/479; G01S 17/58; G01H 9/004; G01H 9/00; G02B 27/48; G01P 3/36
See application file for complete search history.

(56) References Cited

U.S. PATENT DOCUMENTS

| | | | |
|---|---|---|---|
| 6,037,579 A | * | 3/2000 | Chan .................. G01N 21/4795 250/216 |
| 9,279,718 B2 | | 3/2016 | Grund |
| 2003/0043363 A1 | | 3/2003 | Jamieson et al. |

(Continued)

FOREIGN PATENT DOCUMENTS

EP         0916938 A2      5/1999

OTHER PUBLICATIONS

European Search Report, European Patent Application No. 18159431. 8, dated Sep. 18, 2018, 12 pages.

(Continued)

*Primary Examiner* — Michael P LaPage
(74) *Attorney, Agent, or Firm* — McDonnell Boehnen Hulbert & Berghoff LLP

(57) ABSTRACT

Described herein is a method and system for mitigating the effects of speckle in a laser Doppler system, and, in particular in a laser Doppler vibrometry/velocimetry system. A scan unit is provided in at least one of: a transmit path for scanning at least one beam from a transmitting antenna over a moving target surface and a receive path for scanning at least one reflected beam received from the moving target surface onto a receiving antenna. An averaging unit is provided prior to post-processing or demodulation to average electrical signals corresponding to the reflected beams. By averaging before demodulation, speckle in the output signal is mitigated.

13 Claims, 14 Drawing Sheets

(56) References Cited

U.S. PATENT DOCUMENTS

2013/0206963 A1* 8/2013 Grund ................. G01J 1/0407
250/208.1

OTHER PUBLICATIONS

Aranchuk, Vyacheslav et al., "Speckle Noise in a Continuously Scanning Multi-Beam Laser Doppler Vibrometer for Acoustic Landmine Detection", Detection and Remediation Technologies for Mines and Minelike Targets XI., vol. 6217. International Society for Optics and Photonics, May 2006, 10 pages.
Tan, Ou, et al. "Speckle Reduction in Swept Source Optical Coherence Tomography Images with Slow-Axis Averaging." Optical Coherence Tomography and Coherence Domain Optical Methods in Biomedicine XVI. vol. 8213. International Society for Optics and Photonics, 2012, pp. 82132Z-1-82132Z-8.
Sracic, Michael W. et al., "Experimental Investigation of the Effect of Speckle Noise on Continuous Scan Laser Doppler Vibrometer Measurements", 27th International Modal Analysis Conference (IMAC-XXVII), Orlando, FL, Feb. 2009, 17 pages.

* cited by examiner

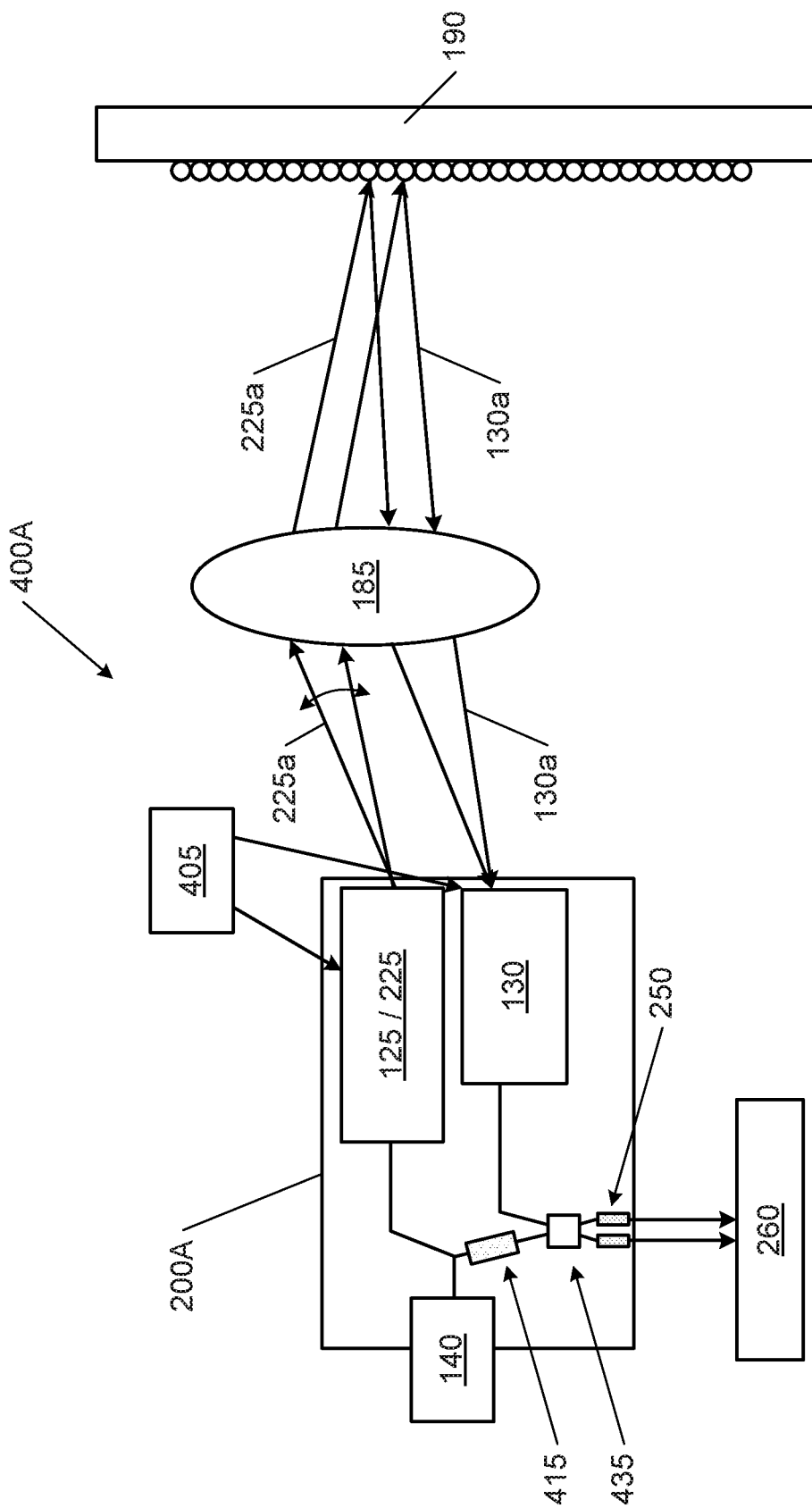

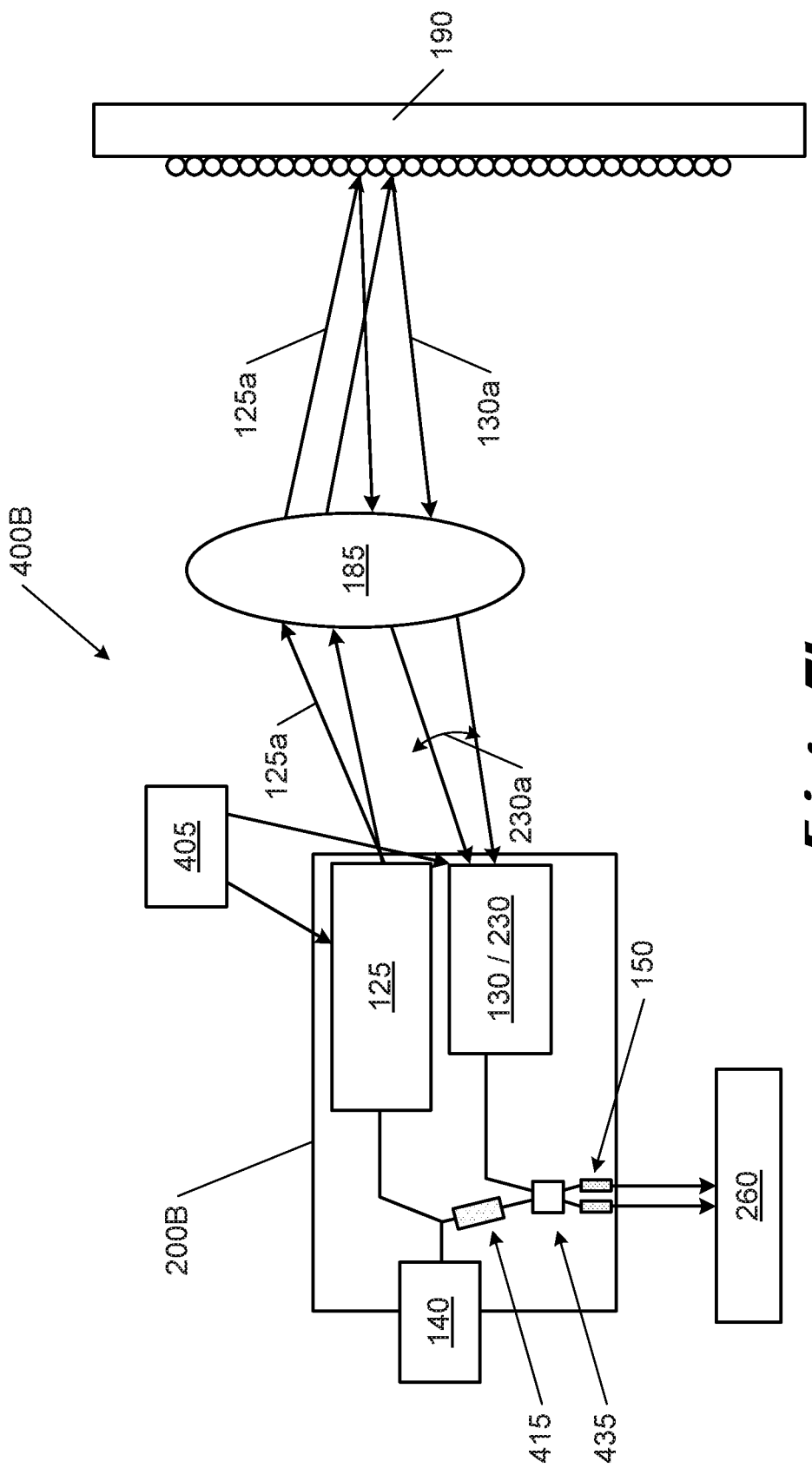

SPECKLE MITIGATION

CROSS-REFERENCE TO RELATED APPLICATIONS

The present application is a non-provisional patent application claiming priority to European Patent Application No. 18159431.8, filed Mar. 1, 2018, the contents of which are hereby incorporated by reference.

FIELD OF THE DISCLOSURE

The present disclosure relates to improvements in or relating to speckle mitigation, and, is more particularly concerned with laser Doppler vibrometry/velocimetry.

BACKGROUND

Speckle patterns typically occur in diffuse reflections of monochromatic light, for example, laser light and is due to interference of many waves having the same frequency, but different phases and amplitudes. The waves add together to provide a resultant wave whose amplitude and intensity vary randomly both in space and time domains. When using laser systems to measure displacement or velocity, the temporal evolution of speckle patterns generated are problematic, particularly, in laser Doppler vibrometry/velocimetry (LDV).

LDV relies on optical coherent detection using laser beams, and, an optical interferometer is a key component to an LDV system. As is known in the field of interferometry, optical beams are used to provide measurements in the form of coherent signals. During the measurement, at least one coherent light beam (measurement signal) is sent to a target to be measured, and, an amount of light (reflected signal) is reflected back to measurement system. The reflected light is combined with at least one reference signal or beam which is coherent with the reflected light to create an interference effect. Due to the frequency difference, the optical intensity of the combined signals changes in the time domain, and these variations can be converted to electrical signals in a single photo-detector (PD) or multiple PDs. Because the frequency of the electrical signal is linearly related to the Doppler shift of the reflected signal, the velocity and the displacement of the target can be derived. LDV systems can be homodyne, where the carrier frequencies of the reference signal or beam and the measurement signal or beam are the same, or heterodyne, where the carrier frequency of the reference signal or beam is different from that of the measurement signal or beam.

Retroreflectors may be attached to a surface of a target to enhance reflections in the direction of the incident beam. These retroreflectors can be micro-prism based reflectors or micro-beads reflectors, and, both of these designs can be used to enhance reflections back to the incoming directions. Whilst a piece of retroreflector with many micro-reflecting-units may be used in order to avoid issues with alignment, such retroreflectors tend to generate speckle patterns.

Whilst it is possible to remove speckle from a reflected beam if the size of the focused laser beam is smaller than the one scattered from the surface of the target or from a reflection unit in case of retroreflectors. However, it is necessary to ensure that the light is just focused on the right location of the target or scatterer, otherwise the reflection can be very weak. Whenever there is an in-plane movement of the retroreflector, the measurement light beam can be shifted from one scatterer to another scatterer with a random height thereby producing an error in the LDV output. The impact of this effect is very similar to that of a speckle pattern.

In the article entitled "Experimental Investigation of the Effect of Speckle Noise on Continuous Scan Laser Doppler Vibrometer Measurements" by Michael W. Sracic and Matthew S. Allen of the University of Wisconsin-Madison, IMAC 2009, a continuous scan laser Doppler vibrometry (CSLDV) system is described in which in which a laser spot is scanned continuously over a structure to make multiple measurements at the same time. The CSLDV measurements are transformed into a set of responses which can be processed using standard identification techniques to extract modes from the measurements. Resampling is used when the scan frequency is high relative to the highest natural frequency of interest, and whilst scanning vibrometers are capable of scanning a relatively high scan frequencies, there is a trade-off between measurement quality and scan frequency due to laser-speckle noise. Scanning in this particular case is needed to map the vibration mode and not for speckle mitigation, and the signals are averaged after demodulation.

However, averaging of the demodulated signals includes errors created by speckle patterns, namely, the signal-to-noise ratio (SNR) of the raw signals is lower due to speckle noise, and, due to the non-linear demodulation process, jumps in the signal output are obtained. As a result, averaging the demodulated signal tends to be difficult.

SUMMARY

In accordance with one aspect of the present disclosure, there is provided a method of mitigating the effects of speckle in a laser-based vibration/velocity sensor, the method comprising the steps of (i) generating at least one light beam from at least one coherent light source, (ii) splitting the at least one light beam into a first component and a second component, (iii) directing the first component of the at least one light beam to a transmitting antenna, (iv) transmitting the first component of the at least one light beam from the transmitting antenna towards a moving target surface, (v) receiving at least one reflected light beam from the moving target surface at a receiving antenna, (vi) combining the at least one reflected light beam with the second component of the at least one light beam to form at least one combined beam, (vii) converting the at least one combined light beam into at least one electrical signal, and (viii) processing the at least one electrical signal to derive an output signal indicative of motion of the moving target surface. Transmitting the first component comprises scanning the at least one light beam over the moving target surface. Receiving the at least one reflected light beam comprises scanning the at least one reflected light beam onto the receiving antenna. Processing the at least one electrical signal comprises averaging the electrical signals corresponding to reflected beams and demodulating the averaged electrical signals.

By scanning the beams, either on the transmit path or the receive path, multiple signals are obtained are averaged and then demodulated to compensate for the impact of speckle in the output signal created by the combined beam.

In an embodiment, transmitting the first component comprises scanning the at least one light beam over the moving target surface and receiving the at least one reflected light beam comprises receiving the reflected scanned beams from the moving target surface.

In this way, the scanned beam produces multiple reflected scanned beams from the moving target surface which can then be averaged prior to demodulation.

In an embodiment, wherein receiving the at least one reflected light beam comprises scanning the at least one reflected beam from the moving target surface at the receiving antenna and transmitting the first component comprises transmitting the at least one light beam from the transmitting antenna to the moving target surface.

In this way, the scanned reflected beams on the receiving antenna produce multiple beams which can then be averaged prior to demodulation.

Converting the at least one combined light beam into at least one electrical signal comprises detecting the at least one combined beam using a detector array, the electrical signals corresponding to the output from each detector element in the detector array. In this way, the detector array (comprising one or more detector elements) generates electrical signals in a convenient form for subsequent processing.

Converting the at least one combined light beam into at least one electrical signal further comprises reading out the electrical signals from the detector array. Having read out the electrical signals from the detector array, they can be averaged prior to demodulation.

Optionally, the method may further comprise focusing at least one of: the transmitted light beam onto the moving target surface and the reflected light beam at the receiving antenna. This enables the measurement beams to be more clearly focused on the moving target surface as well as collecting the reflected beams for focusing on the receiving antenna.

In accordance with another aspect of the present disclosure, there is provided a laser-based vibration/velocity sensor comprising (i) at least one coherent light source configured for generating at least one light beam; (ii) at least one splitter configured for splitting the at least one light beam into a first component and a second component; (iii) a transmitting antenna configured for receiving the first component of the at least one light beam from the at least one light source and for transmitting the first component of the at least one light beam to a moving target surface; (iv) a receiving antenna configured for receiving at least one reflected light beam from the moving target surface; (v) a combiner configured for combining with the at least one reflected beam with the second component of the at least one light beam to form at least one combined beam; (vi) a detector array configured for receiving the at least one combined light beam from the combiner and for converting the at least one combined light beam into at least one electrical signal; (vii) at least one processor configured for processing the at least one electrical signal to derive an output signal indicative of motion of the moving target surface; (viii) at least one of a transmit scan unit configured for scanning the first component of the at least one light beam over the moving target surface and a receive scan unit configured for scanning the at least one reflected beam onto the receiving antenna; and (ix) an averaging unit configured for averaging electrical signals corresponding to the at least one combined beam and for passing the averaged electrical signals to the at least one processor for demodulation.

By having a scan unit in either the transmit or the receive path, multiple reflections are obtained from a moving target surface and these can be averaged prior to demodulation to mitigate the effects of speckle created by the combined beam.

In an embodiment, the at least one coherent light source, the transmitting antenna, the receiving antenna, the detector array, and at least one of: the scan transmit unit and the receive scan unit form part of a photonic integrated circuit.

In this embodiment, the sensor further comprises a driver circuit configured for driving the photonic integrated circuit.

The sensor further comprises a readout electronics circuit configured for reading out the electrical signals from the detector array.

In an embodiment, the sensor may further comprise an optical frequency shifter configured for shifting the frequency of at least one of: the first component of the at least one light beam and the second component of the at least one light beam prior to combining with the at least one reflected beam.

Focusing optics may be provided which are configured for focusing at least one of: the transmitted light beam onto the moving target surface and the reflected light beam at the receiving antenna.

In accordance with a further aspect of the present disclosure, there is provided a laser Doppler vibrometry/velocimetry system including a sensor as described above.

BRIEF DESCRIPTION OF THE FIGURES

The above, as well as additional, features will be better understood through the following illustrative and non-limiting detailed description of example embodiments, with reference to the appended drawings.

FIG. 7a is a schematic illustration of a heterodyne laser Doppler vibrometry/velocimetry system or sensor with optical frequency shifter and transmit beam scanning, according to an example embodiment;

FIG. 7b is a schematic illustration of a heterodyne laser Doppler vibrometry/velocimetry system or sensor with optical frequency shifter and receive beam scanning, according to an example embodiment;

Figure 1B:
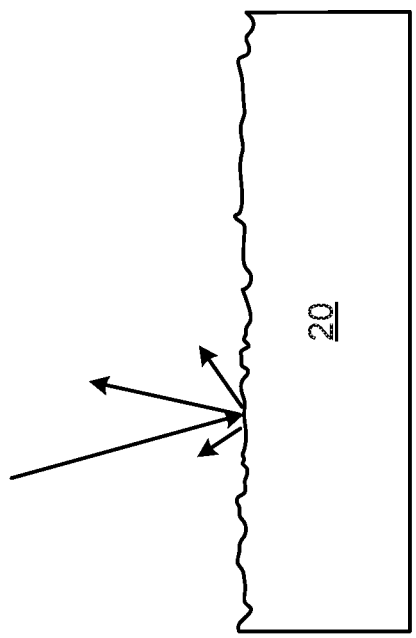
FIGS. 1a to 1d are schematic illustrations showing reflections of incident light beams from different surfaces, according to example embodiments.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

The present disclosure will be described with respect to particular embodiments and with reference to certain drawings but the disclosure is not limited thereto. The drawings described are only schematic and are non-limiting. In the drawings, the size of some of the elements may be exaggerated and not drawn on scale for illustrative purposes.

Figure 1D:
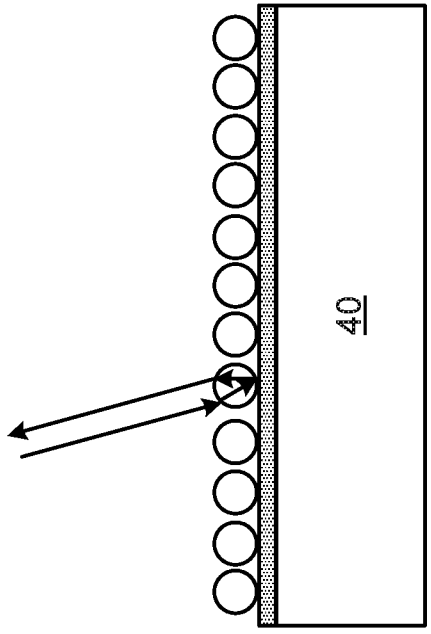
Figure 1A:
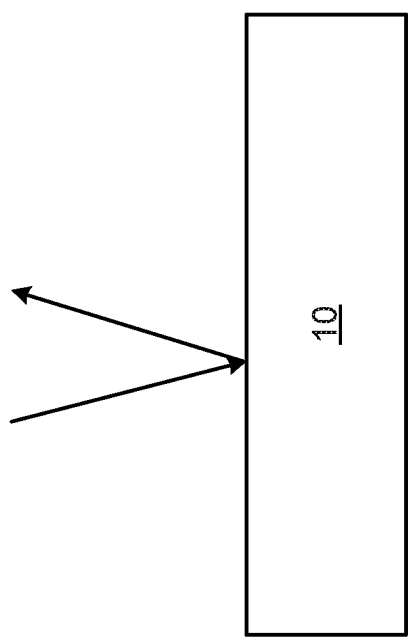
Figure 1C:
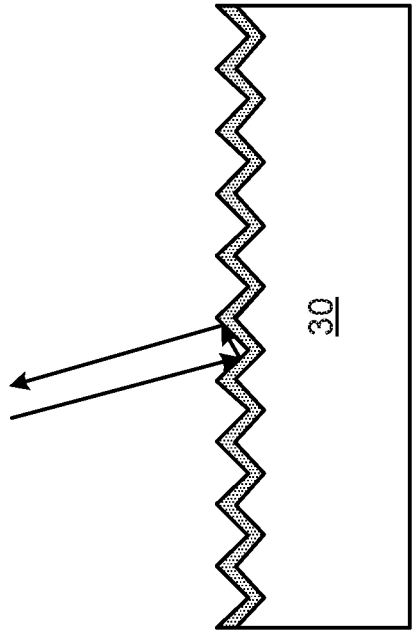

Reflection from four different types of target surface are shown in FIGS. 1a to 1d. FIG. 1a illustrates reflection from an optically smooth planar surface; FIG. 1b illustrates reflection from an optically rough surface; FIG. 1c illustrates reflection from a micro-prism retroreflector which can be mounted on a target surface; and FIG. 1d illustrates reflection from a micro-bead retroreflector which can be mounted on a target surface.

In many cases, the surface roughness or structured topology of the target is large (for the given wavelength of the light source). As a result, the reflection beam has intensity and phase fluctuations in the space domain, that is, the optical intensity/phase is strong in some places and weak in others. This intensity fluctuation pattern is usually called a speckle pattern. The speckle pattern occurs because reflections originating from different locations of the target interfere, and, as the phases and intensities of the reflections from different sites of a rough surface are random, the locations of the speckles are hard to predict. The distribution of the speckles also changes randomly if the target is moving. During a measurement using laser Doppler vibrometry/velocimetry (LDV), two major impacts due to the temporal change of speckles may exist. On one hand, the optical power reflected to an LDV receiver can drop to a very low level for a certain period due to the temporal change in the speckles, and, on the other hand, the phases of reflected optical signal can vary randomly due to the change of speckles. These issues will lead to a low quality signal in the LDV output, for example, a low signal-to-noise ratio (SNR) and even output errors such as unexpected phase drift.

Whilst the present disclosure is described with reference to photonic integrated circuit (PIC) technology, other technologies may be used where components similar to those described can be implemented in another platform, such as, discrete optics or fiber optics.

Figure 2:
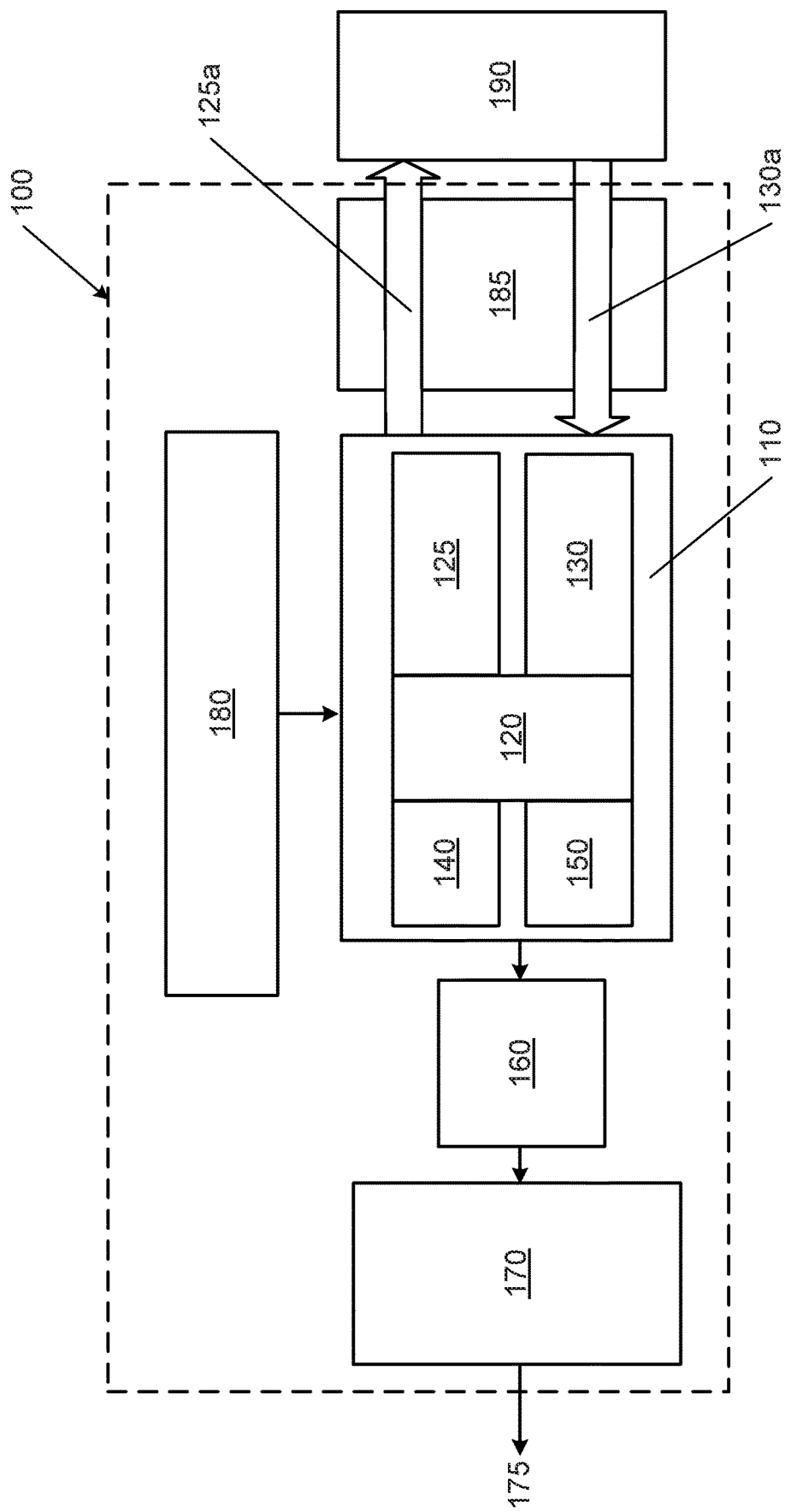
FIG. 2 is a schematic illustration of a conventional photonic integrated circuit for a laser Doppler vibrometry/velocimetry system or sensor, according to an example embodiment.

A conventional LDV system or sensor 100 is shown in FIG. 2. The system or sensor comprises a photonic head 110 including an LDV circuit 120, an optical transmitting antenna 125, an optical receiving antenna 130, a laser source 140 and a photodiode or photodiode array 150. A readout electronics circuit 160 is connected to the photonic head 110 and to a post-processing circuit 170 which provides an output signal 175. The output signal is typically an angle θ that is proportional to the displacement of the target 190. The photonic head 110 is connected to a driver circuit 180. A driver circuit 180 is configured for controlling the operation of the photonic head 110. Optional external optics 185 may be provided between the photonic head 110 and a moving target surface 190.

In the transmit path, the laser source 140 provides a beam for the transmitting antenna 125, via the LDV circuit 120, the beam being directed to the target surface 190 as indicated by arrow 125a.

In the receive path, reflections from the target surface 190, as indicated by arrow 130a, are received at the receiving antenna 130 and directed, via the LDV circuit 120, to the photodiode or photodiode array 150.

The photodiode or photodiode array 150 provides electronic signals in accordance with the reflections received by the antenna 130 to the readout electronics circuit 160. The readout electronics circuit 160 passes the electronic signals to the post-processing circuit 170 for processing to provide the output signal 175.

If present, the external optics 185 is used to focus the beam, indicated by arrow 125a, onto the moving target surface 190 from the optical transmitting antenna 125, and, to focus the reflections from the moving target 190, indicated by arrow 130a, at the optical receiving antenna 130.

Figure 3:
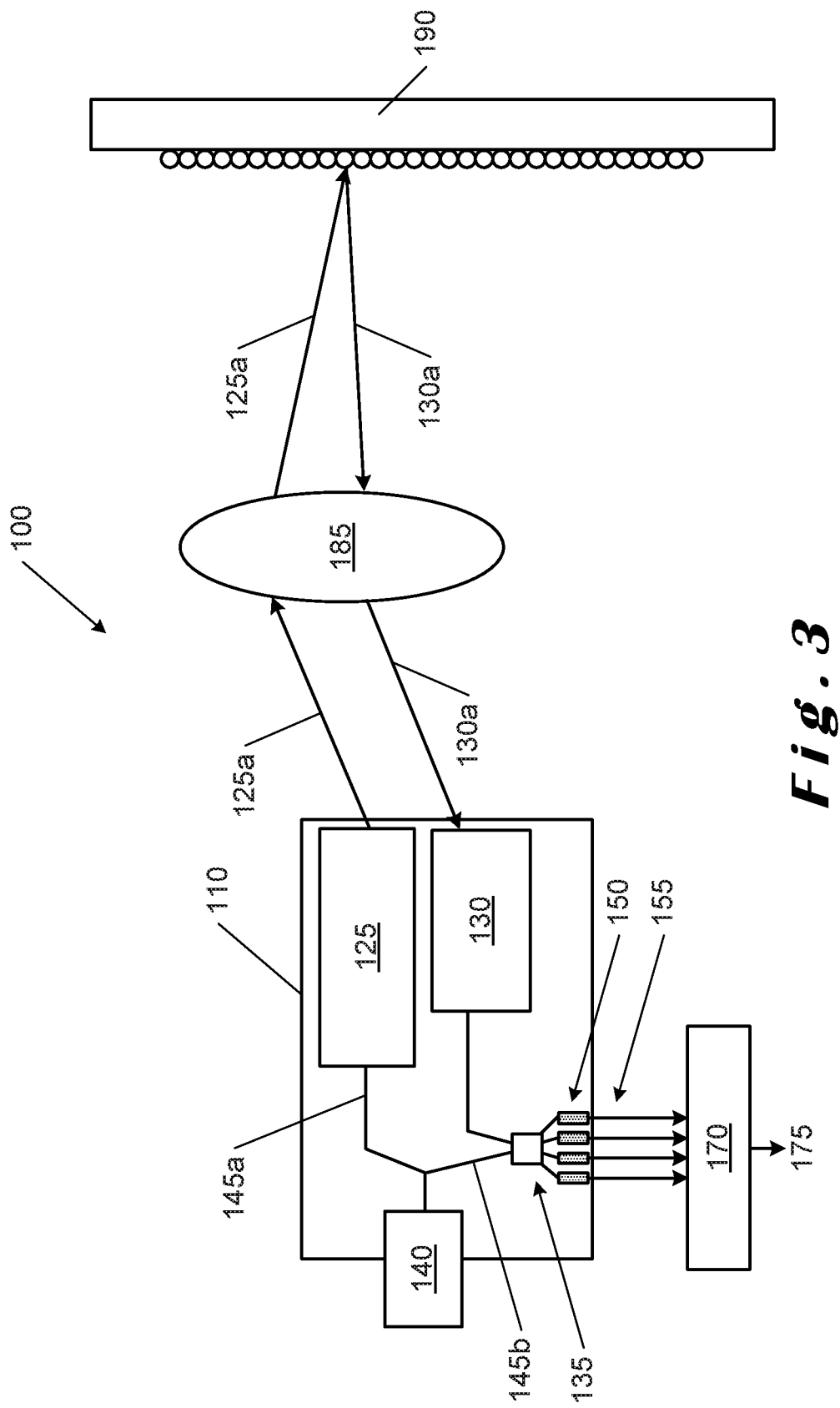
FIG. 3 is a schematic illustration of a conventional homodyne laser Doppler vibrometry/velocimetry system or sensor with 90 degree optical hybrid, according to an example embodiment.

The PIC technology in the photonic head may comprise, for example, a homodyne LDV as shown in FIG. 3. Here, components described with reference to FIG. 2 have the same reference numerals.

In the photonic head 110, the laser source 140 is connected to a Mach-Zehnder interferometer (MZI). One arm of the MZI, providing a measurement beam 145a, is connected to the optical transmitting antenna 125 so that light can be transmitted from the photonic head 110 to the target surface 190 as shown by beam 125a.

As described above, external optics 185 may be provided for focusing the light onto the moving target surface 190.

Light reflected from the moving target surface 190, indicated by beam 130a, is received in the photonic head 110 by the optical receiving antenna 130 which generates a reflection signal. Another arm of the MZI, indicated as 145b, is called the reference arm. The light signal from the reference arm 145b is combined with the reflection signal from the optical receiving antenna 130 with an integrated 90-degree optical hybrid 135 and a photodiode array 150 comprising four photodiode elements (PDs). The output from the photodiode array 150 comprises four photo-current signals, s1, s2, s3, s4, which can be expressed as:

$s1 = dc + r \cdot \sin\theta$ $s2 = dc - r \cdot \sin\theta$ $s3 = dc + r \cdot \cos\theta$ $s4 = dc - r \cdot \cos\theta$ where θ is the Doppler phase shift of the moving target surface 190, r is proportional to the amplitude of the reflection, and dc is the dc signal, and, is proportional to the displacement of the reflection signal, that is:

$$\theta = \frac{4\pi d}{\lambda} + \theta_0,$$

where $\theta_0$ is a constant phase, λ is the wavelength of the light, and d is the displacement of the target.

In order to determine the value of θ and therefore the displacement signal, a demodulation method is used in the post-processing circuit 170. One demodulation method generally used is an arctan method, that is, the dc signal is removed by subtraction:

$$I = s1 - s2 = 2r \cdot \sin\theta$$

$$Q = s3 - s4 = 2r \cdot \cos\theta$$

and calculate:

$$\theta = \arctan\left(\frac{I}{Q}\right)$$

The laser source 140 may be integrated on the PIC by using a technique called micro-optical bench or using other techniques. The photodiode array 150 may also be integrated on the PIC, for example, if the PIC is based on silicon-on-insulator (SOI), the PDs may be integrated germanium PDs.

Each of the optical transmitting antenna 125 and the optical receiving antenna 130 may comprise a surface grating based coupler, an edge coupler, or any other suitable coupler in the PIC. For ease of explanation, the optical transmitting antenna 125 and the optical receiving antenna 130 are considered to be surface grating based couplers in the following description.

Figure 4:
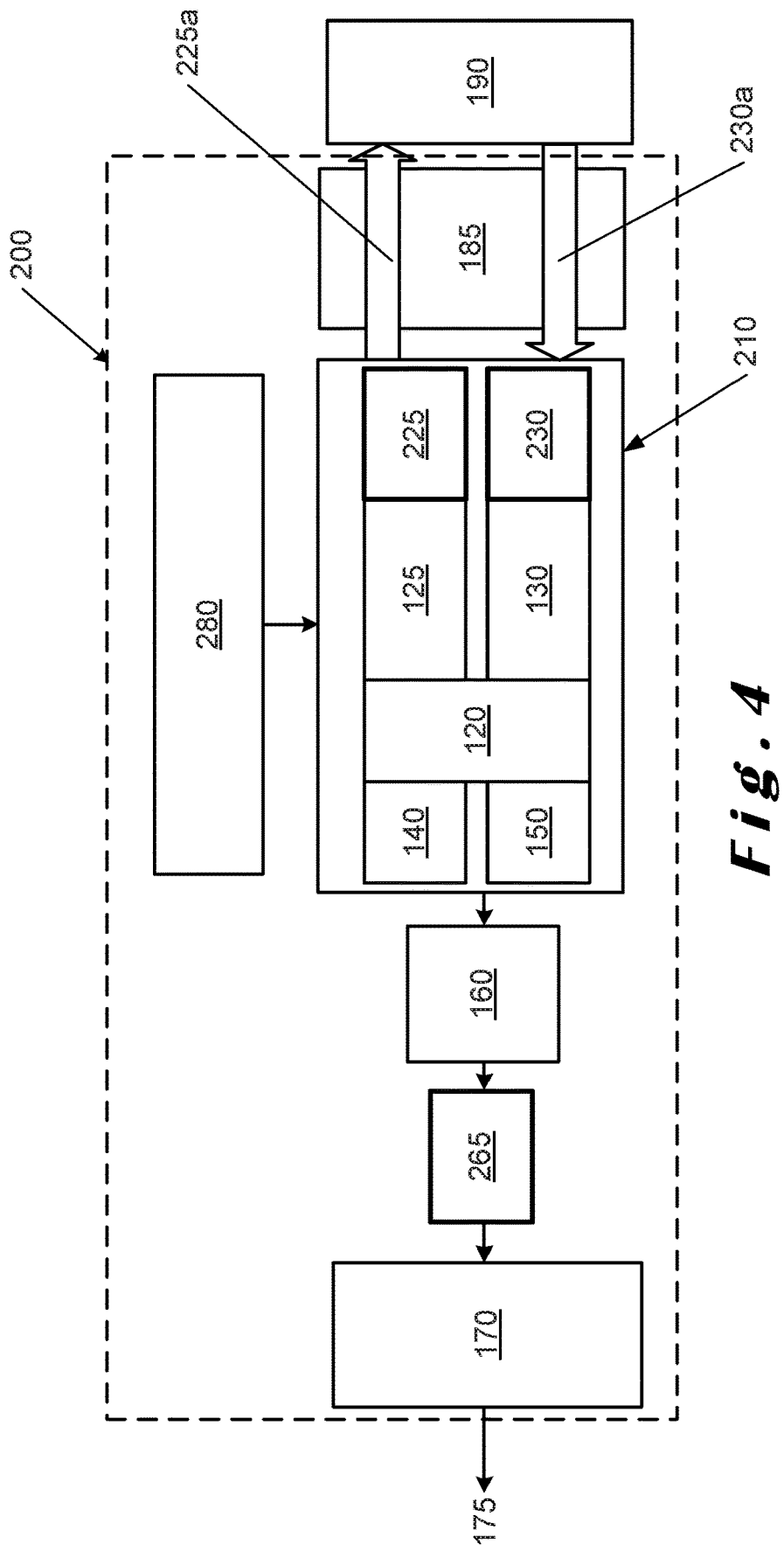
FIG. 4 is a schematic illustration of a photonic integrated circuit laser Doppler vibrometry/velocimetry system or sensor, according to an example embodiment.

In accordance with the present disclosure, a scan-averaging method is implemented. An LDV system or sensor 200 in accordance with the present disclosure is shown in FIG. 4. The LDV system or sensor 200 has components in common with the LDV system or sensor 100 shown in FIG. 2, and, components previously described with reference to FIG. 2 have the same reference numerals.

The LDV system or sensor 200 comprises a photonic head 210 including an LDV circuit 120, an optical transmitting antenna 125, an optical receiving antenna 130, a laser source 140 and a photodiode array 150 as described above with reference to FIG. 2. Whilst these components may be formed in a photonic head, it is not essential and some of the components, for example the light source and/or detectors, may be separate components not located on the PIC.

A readout electronics circuit 160 is connected to the photonic head 210 and to a post-processing circuit 170. The post-processing circuit 170 provides an output signal 175. The photonic head 210 is connected to a driver circuit 280. The driver circuit 280 is configured for controlling the operation of the photonic head 210. If a photonic head is not used, a driver circuit is still necessary for driving the LDV system or sensor.

Optional external optics 185 may be provided between the photonic head 210 and the moving target surface 190 as described above.

In accordance with an embodiment of the present disclosure, the LDV system or sensor 200 includes a transmit scan unit 225 and an averaging unit 265.

The transmit scan unit 225 is located within the photonic head 210 in the transmit path following the optical transmitting antenna 125 and is configured for scanning the light transmitted by the optical t antenna 125 across the surface of the moving target surface 190. The scanned reflections from the moving target surface 190 are received by the optical receiving antenna 130 and converted to electrical signals by the PDs in the photodiode array 150. The electrical signals are then readout by the readout electronics circuit 160.

The averaging unit 265 is located between the readout electronics circuit 160 and the post-processing circuit 170. The averaging unit 265 averages the signals received from the readout electronics circuit 160 prior to post-processing as described below.

As an alternative to having a transmit scan unit 225 in the transmit path, a receive scan unit 230 may be provided in the receive path. If the receive scan unit 230 is an alternative to the transmit scan unit 225, it receives the reflections from the moving target surface 190 and scans them over the optical receiving antenna 130 by changing the receive angle and/or the location of the receive antenna to generate scanned signals which are averaged in the averaging unit 265. In this way, the receive scan unit 230 may be combined with the receive antenna 130 to provide two functions in a single component.

The transmit scan unit 225 may comprise a fast scanner configured for scanning the beam 125a across the moving target surface 190. The transmit scan unit 225 may be implemented on the PIC as a plasma-dispersion modulator, an electro-optic modulator or an acousto-optic modulator.

The receive scan unit 230, if present, may also be implemented on the PIC as a plasma-dispersion modulator, an electro-optic modulator or an acousto-optic modulator.

Both the transmit scan and the receive scan can be realized using a fast sweeping wavelength and a specific photonic circuit.

The transmit scan and/or the receive scan can be combined with a polarization scan to increase the number of samples which can be used for the averaging unit 265.

Figure 5A:
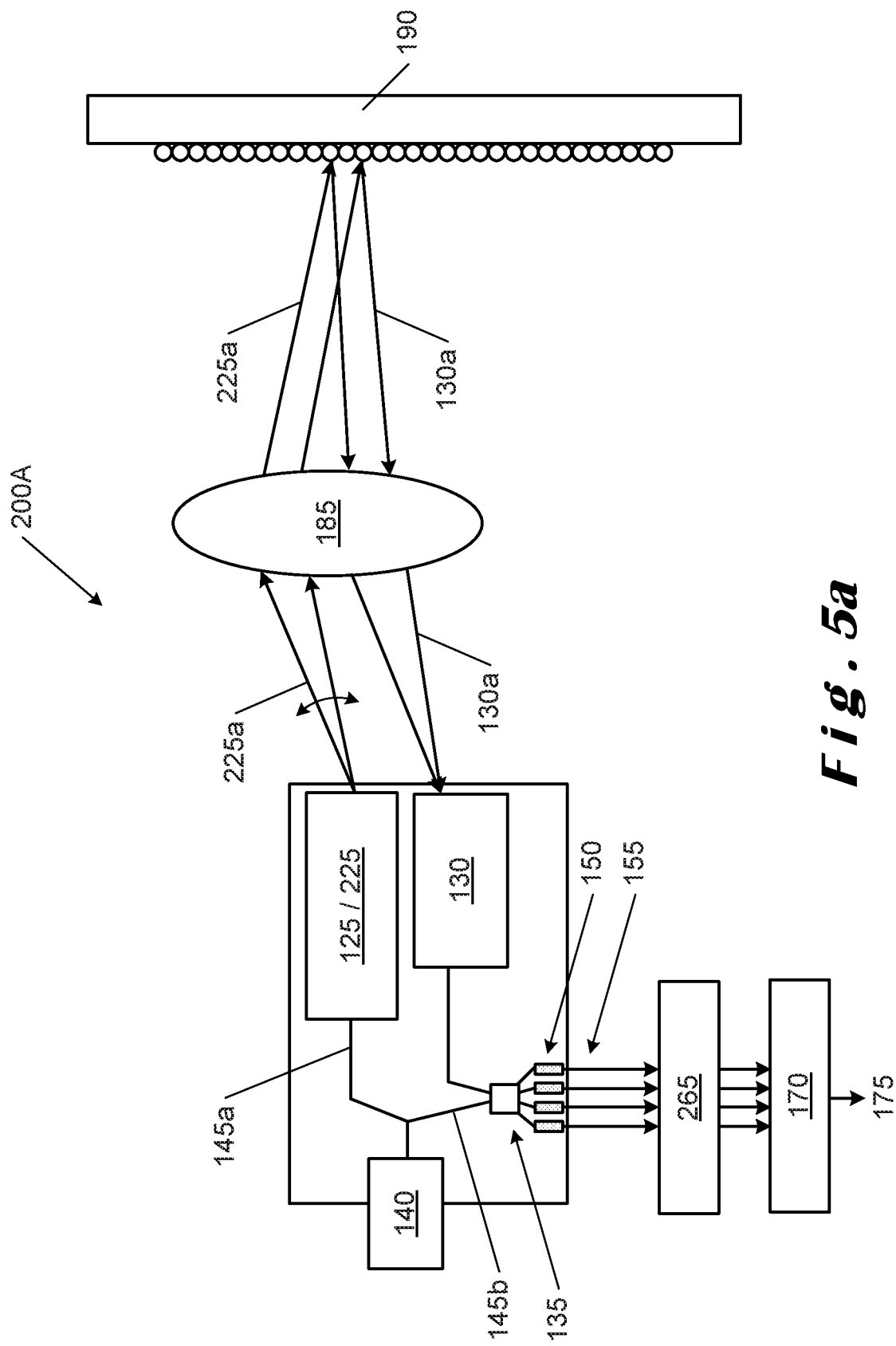
FIG. 5a is a schematic illustration of a homodyne laser Doppler vibrometry/velocimetry system or sensor with 90 degree optical hybrid and transmit beam scanning, according to an example embodiment.
Figure 5B:
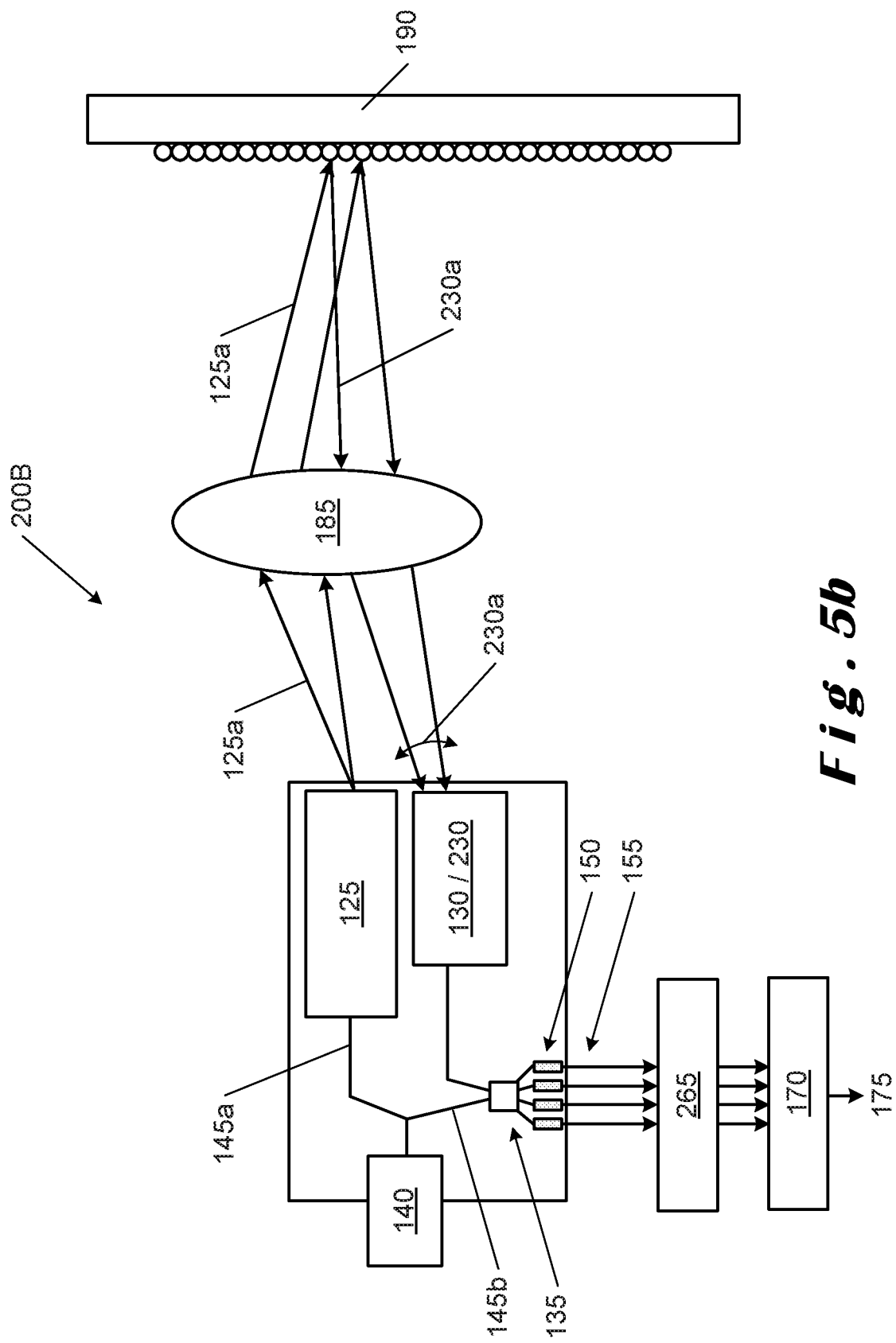
FIG. 5b is a schematic illustration of a homodyne laser Doppler vibrometry/velocimetry system or sensor with 90 degree optical hybrid and receive beam scanning, according to an example embodiment.

The averaging unit 265 is configured to average the "raw" LDV photo-current signals, s1, s2, s3, s4 as shown in FIGS. 5a and 5b. The averaging unit 265 may comprise a low-pass filter, a band-pass filter, an averaging algorithm in the digital domain, or slow PDs, and can be placed before the demodulated signal recovered from the LDV signals received from the photonic head 210. The averaging unit 265 can also be included in any step of the demodulation process performed by the processing circuit 170 provided that the signals of such a step do not correspond to the final demodulated signals.

The LDV system or sensor 200A of FIG. 5a has components in common with the LDV system or sensor 100 shown in FIG. 3, and, components previously described with reference to FIG. 3 have the same reference numerals. As shown, the measurement beam 145a forming the measurement arm of the MZI is directed to the optical transmitting antenna 125 and transmit scan unit 225. A scanning beam 225a is directed to the moving target surface 190 (shown having micro-bead retroreflectors) and reflected beams 130a are directed to the optical receiving antenna 130. As described above, four photo-current signals s1, s2, s3, s4 are generated by the photodiode array 150 are combined with the reference beam 145b in the reference arm of the MZI. The combined signals 155 are passed to the averaging unit 265 where the received signals corresponding to the scanned beam 225a are averaged prior to demodulation in the post-processing circuit 170.

The transmit scan unit 225 and the averaging unit 265 may be used together. The scan speed should be high enough so that the resulting temporal fluctuation frequency in the photo-current signal is higher than the band of the detected signal. One general rule is that the scan frequency $f_s$ should be kept larger than Carson's bandwidth, that is:

$$2(\Delta f + f_m)$$

where $f_m$ is the maximum vibration frequency of the moving target surface and $\Delta f$ is the maximum Doppler shift introduced to the measurement signal due to the movement of the moving target surface.

The averaging unit 265 is configured to remove high frequency fluctuations in photo-currents caused by the scan, while still keeping the frequency band of the useful signal.

If the averaging unit 265 is a low-pass filter, the cut-off frequency of the filter, $f_{lp}$, should be in the range of $[(\Delta f + f_m), f_s - (\Delta f + f_m)]$.

In an embodiment, a separate averaging unit 265 may not be needed if the scan is at a speed such that the resulting temporal fluctuations in the received signals is higher than the working bandwidth of the readout electronics circuit 160. In this case, the readout electronics circuit 160 itself forms an averaging unit.

Whilst it is possible to have both a transmit scan unit for the transmitting antenna and a receive scan unit for the receiving antenna, it is not essential to have both present at the same time.

Where only a transmit scan unit 225 is implemented as shown in FIGS. 4 and 5a, the measurement beam sent out from the PIC can be scanned in the angle domain, or in the space domain, or in both angle and space domains. The purpose of this scan is to ensure that the beam sent to the target can be scanned in a space domain on the target so that the scanned beam can walk across several scatterers in a certain pattern, for example, a circle. If free-space optics used to deliver the output beams to the target, the relation between the output scan and beam scan on the target is determined by the free-space optical system. For example, in many cases, a free-space optics may be used to realize an imaging system in which the target surface is placed on the image plane of the transmitting antenna. The imaging system ensures that a large percentage of the reflected light from the moving target surface can be collected back at the receiving antenna. In an imaging system with a magnification of M, the displacement of the scanned beam on the target is M times of the beam displacement on the PIC. Reflection signals from different places in the scanned area are sent back to the 90 degree optical hybrid 135 and are combined with the reference signal before being passed to the PDs in the photodiode array 150.

FIG. 5b is similar to FIG. 5a with the LDV system or sensor 200B of FIG. 5b being configured for a receive scan unit 130/230. Components described above with reference to FIGS. 4 and 5a have the same reference numbers.

In FIG. 5b, a measurement beam 125a is directed to the moving target 190 and the reflected beam 230a from the moving target 190 is scanned over the receive antenna 130 by a receive scan unit 230. Other components in the LDV system or sensor 200B of FIG. 5b are similar to those of the LDV system or sensor 200A of FIG. 5a.

Where only a receive scan unit is used, the measurement beam sent out from the PIC is not scanned over the moving target surface. The receive scan unit 230 captures a field with at least one bright speckle. The receive scan unit is used to collect reflection speckles at different locations and/or angles at a fast speed. In this case, the reflection beam collected by the PIC has a random variation at a high frequency. This high frequency signal can also be filtered out with a low-pass or band-pass filter placed after the PDs in the photodiode array 150.

Figure 6:
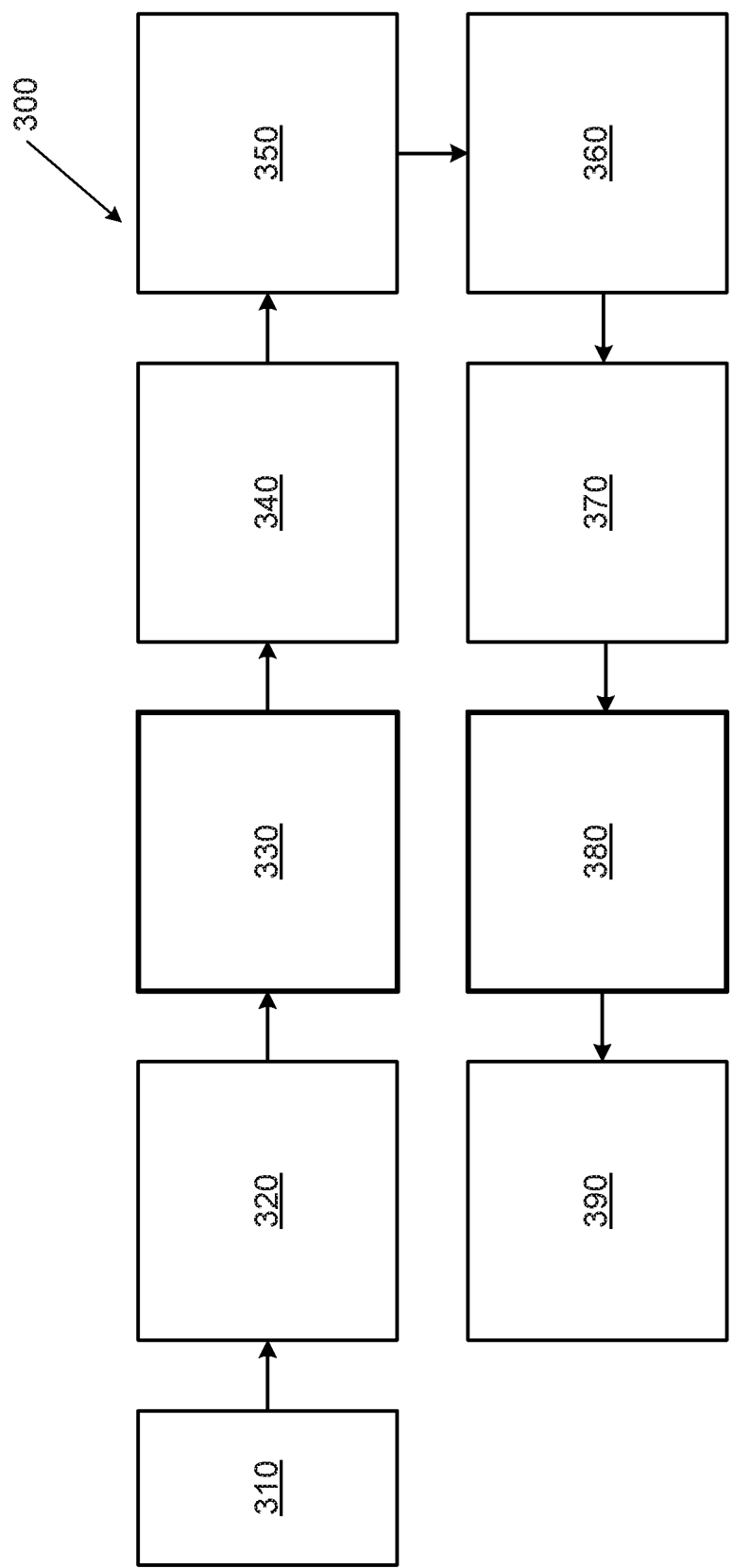
FIG. 6 illustrates a flow chart of the steps of a method for operating a photonic integrated circuit laser Doppler vibrometry/velocimetry system or sensor, according to an example embodiment.

FIG. 6 illustrates a flow chart 300 indicating steps in a method for the operation of the LDV system or sensor 200 and 200A in accordance with the present disclosure as shown in FIGS. 4 and 5a. Naturally, some of the steps are the same as those for the LDV system or sensor 200B of FIG. 5b. The first step (step 310) is to generate a stable laser beam from the laser source 140. The stable laser beam is split into a measurement beam 145a and a reference beam 145b (step 320). The measurement beam 145a passes to the transmitting antenna 120 and associated transmit scan unit 225 where it is scanned over the moving target surface as a measurement beam 225a at high speed (step 330). A reflected beam 130a from the moving target surface is received at the receiving antenna 130 (step 340) and combined with the reference beam 145b in the 2×4 optical hybrid 135 (step 350). Four photo-current signals, s1, s2, s3, s4, are generated from respective ones of four PDs in the photodiode array 150 (step 350) and are converted to voltage signals with two differential signals being determined where: I=s1-s2 and Q=s3-s4 (step 360). The values of I and Q are averaged using low-pass filters in the averaging unit 265 (step 380) prior to being demodulated in the post-processing circuit 170 to derive θ

$$\theta = \arctan\left(\frac{I}{Q}\right)$$

and to provide output signal 175 (step 390).

Although the embodiments of the LDV are described as having a single measurement beam, it is also possible to have more than one beam which scans the moving target surface 190 with or without micro-bead retroreflectors. Naturally, the moving target surface may include any suitable retroreflector to reflect the light incident thereon.

For the embodiment of FIG. 5b where there is transmit scan unit but a receive scan unit, the method comprises the following steps: (i) a stable laser beam is formed by the laser source 140; (ii) the stable laser beam is split into a measurement beam 145a and a reference beam 145b; (iii) the measurement beam 125a passes to the transmitting antenna 120 and to the moving target surface as a measurement beam 125a; (iv) a reflected beam 230a from the moving target surface is received at the receive scan unit 230 and the reflected beam 230a is scanned over the receive antenna 130; (v) an output signal from the receiving antenna 130 is combined with the reference beam 145b at the 2×4 optical hybrid 135; (vi) four photo-current signals, s1, s2, s3, s4, are generated from respective ones of four PDs in the photodiode array 150 and are converted to voltage signals with two differential signals being determined where: I=s1-s2 and Q=s3-s4; (vii) the values of I and Q are averaged using low-pass filters in the averaging unit 265 prior to being demodulated in the post-processing circuit 170 to derive θ, $$\theta = \arctan\left(\frac{I}{Q}\right),$$

and to provide output signal 175.

In effect, the differences in the operation of the embodiments of FIGS. 5a and 5b are the transmit and receive steps respectively with all other steps being substantially the same.

Heterodyne LDV system or sensor 400A of FIG. 7a has components similar to the homodyne LDV system or sensor 200A of FIG. 5a and components previously described have the same reference numerals. FIG. 7a illustrates a heterodyne LDV system or sensor 400A with an integrated optical frequency shifter 415 placed in the reference arm or beam 145b of the interferometer. In addition, reflected signals from the receiving antenna 130 are combined with the frequency-shifted reference beam in 50:50 splitter 435 prior to the signals being received at two PDs of the photodiode array 250. The reflection signals are read out from the photodiode array 250 by the readout electronics circuit 260 and averaged prior to post-processing as described above. A band-pass filter may be used to average the photo-current signals.

Similarly, for a heterodyne LDV system or sensor 400B shown in FIG. 7b which has components similar to those described with reference to the homodyne LDV system or sensor 200B of FIG. 5b, the components previously described have the same reference numerals. Here, only the receive beam is scanned over the receiving antenna 130 by the receive scan unit 230, scanned reflected signals from the receive scan unit 230 and the receiving antenna 130 are combined with the frequency-shifted reference beam in 50:50 splitter 435 prior to the signals being received at two PDs of the photodiode array 250. The reflection signals are read out from the photodiode array 250 by the readout electronics circuit 260 and averaged prior to post-processing as described above. A band-pass filter may be used to average the photo-current signals.

If the measurement beam is scanned across N scattering units, when the measurement beam is sent to one scattering unit, the reflected signal is:

$$\sqrt{\frac{i_0}{2}} a_k e^{i[\theta_k - \theta_{Doppler}(t) + 2\pi f_{ofs} t]}$$

where $\theta_{Doppler}(t)$ is the Doppler phase shift in the reflection, $\theta_k$ is the phase associated with position of the target which is random, $f_{ofs}$ is the frequency shift in the reference arm (for homodyne $f_{ofs}$ is zero), and $a_k$ is the amplitude of the reflected signal. If the amplitude of the reference signal is $$\sqrt{\frac{1}{2}},$$

the combined signal after a 2×1 combiner would be $$\sqrt{\frac{i_0}{2}} + \sqrt{\frac{i_0}{2}} a_k e^{i[\theta_k - \theta_{Doppler}(t) + 2\pi f_{ofs} t]}$$

For simplicity, if the contribution of each scattering unit is of equal strength, the average signal in the PDs can be expressed as follows:

$$i(t) = i_0 \sum_{k=1}^{N} \frac{\left| \frac{1}{2} + \frac{1}{2} a_k e^{i[\theta_k - \theta_{Doppler}(t) + 2\pi f_{ofs} t]} \right|^2}{N}$$

$$i(t) = \frac{i_0}{4} + \frac{i_0 \sum_{k=1}^{N} |a_k|^2}{4N} + \frac{i_0 \sum_{k=1}^{N} a_k \cos(\theta_k - \theta_{Doppler}(t) + 2\pi f_{ofs} t)}{2N}$$

In both heterodyne and homodyne systems, the first two terms can be removed. Since $\theta_{Doppler}(t) + 2\pi f_{ofs} t$ is a common phase change in the third term, they can also be retrieved by demodulation. Therefore, when the target is making an out-of-plane movement, the phase change obtained after the demodulation is the same as in the case without scanning as $a_k$ and $\theta_k$ do not change during the movement.

However, if there is an in-plane movement at the same time, two things may happen: a number of the scattering units originally in the detection region are no longer illuminated after the movement, while some other scattering units not originally contributing to the reflection move into the detection region and send reflections to the receiving antenna. The change of M scattering units implies that M components in the sum of the third term will be changed with random amplitudes and phases, which leads to a sudden phase change in the demodulated results. However, this change is small compared to the case when there is no averaging. The greater the number of scattering units N taken into consideration for averaging, the better the mitigation of speckles. This averaging can also be made if there is a receive scan unit attached to the receiving antenna instead of a transmit scan unit attached to the transmitting antenna.

The averaging can be realized in different ways. For example, in a homodyne LDV system, the averaging can be implemented using a low-pass filter in which the cutoff bands are lower than the frequency introduced by the scan but higher than the Carson's bandwidth of the useful signal. In a heterodyne LDV system, the averaging unit can be a low-pass filter or a band-pass filter centering at the carrier frequency of the heterodyne photo-current signal.

It is possible to combine either the transmitting antenna or the receiving antenna with the relevant scan unit and these can be implemented in many ways. FIGS. 8a to 8e are schematic illustrations of possible embodiments for a combined transmitting antenna and transmit scan unit.

Figure 8A:
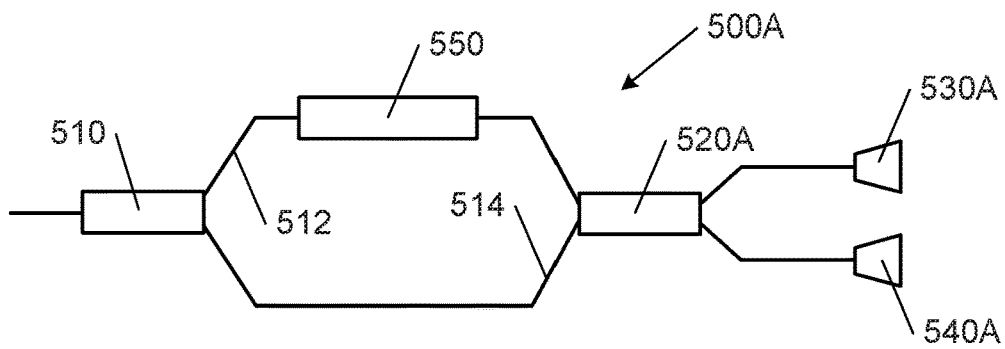
FIGS. 8a to 8e are schematic illustrations of possible configurations for a transmitting/receiving antenna in a photonic integrated circuit utilising a fast phase modulator, according to an example embodiment.

In FIG. 8a, a first embodiment of combined transmitting antenna and transmit scan unit 500A is shown. The MZI is implemented in the transmit path and the phase modulator is configured to work at high speeds. In this embodiment, a first beamsplitter 510 is provided which splits the beam into two paths 512, 514 and then recombines the two paths 512, 514 in a second beamsplitter 520. The second beamsplitter 520A also splits the recombined paths into two new paths for respective ones of couplers 530A, 540A. In path 512, a fast phase modulator 550 is located.

For a SOI platform, it is possible to realize a high speed phase modulator by using the plasma dispersion effect. Here, the measurement light can be coupled out of the PIC via any of the couplers, based on the following equations.

$$i_1 = i_0 \left[ \frac{1}{2} + \frac{\cos\theta(t)}{2} \right]$$

$$i_2 = i_0 \left[ \frac{1}{2} - \frac{\cos\theta(t)}{2} \right]$$

where θ(t) is the phase difference between the two arms of the MZI. In this case, the light beam can be scanned on two places.

Figure 8B:
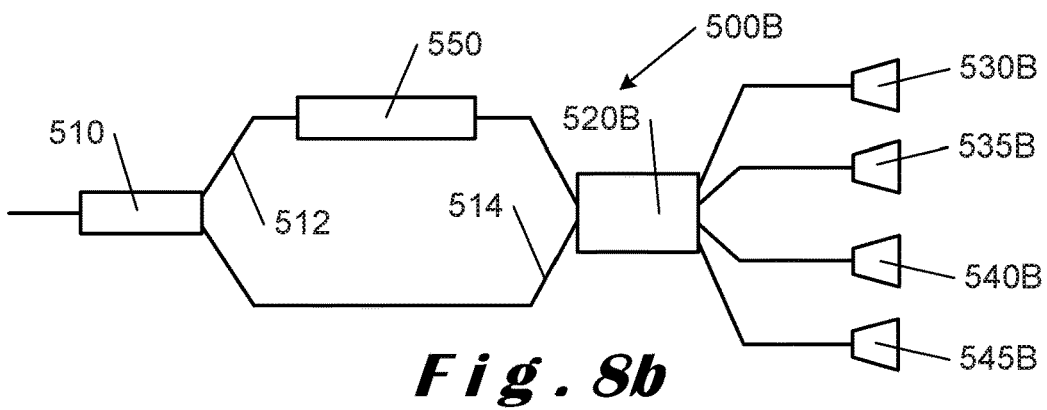

A second embodiment of a combined transmitting antenna and transmit scan unit 500B is shown in FIG. 8b. The unit 500B of FIG. 8b is similar to the unit 500A of FIG. 8a but the second beamsplitter 520A is replaced by a 2×4 splitter 520B which provides four output paths for respective ones of couplers 530B, 535B, 540B, 545B. Each of the four output paths may have different powers with the power distribution changing as the modulator 550 is modulated. The 2×4 splitter 520B may be replaced by 2×N splitter so that the number of output beams can be even greater.

Figure 8C:
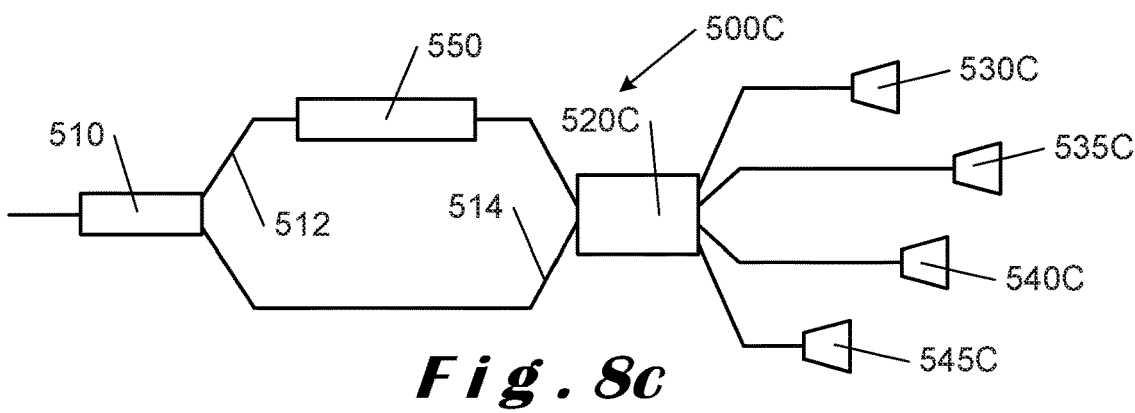

The couplers do not need to be inline and they can be distributed in a different layout as shown in a third embodiment of a combined transmitting antenna and transmit scan unit 500C as shown in FIG. 8c. In this embodiment, couplers 530C, 535C, 540C, 545C connected to a 2×4 splitter 520C are distributed with each one having a different path length.

Figure 8D:
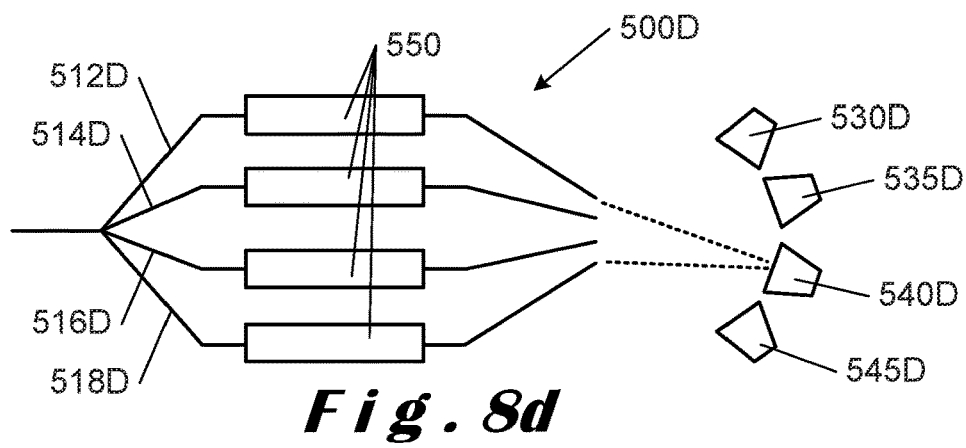

A fourth embodiment of combined transmitting antenna and transmit scan unit 500D is shown in FIG. 8d. FIG. 8d illustrates an arrayed waveguide grating (AWG) configuration in which couplers 530D, 535D, 540D, 545D form the AWG Light from the laser source is split into four paths 512D, 514D, 516D, 518D connected to one of the couplers 530D, 535D, 540D, 545D with each path having a fast phase modulator 550. By controlling the phase relationship in the AWG the output light from the AWG can be sent to different couplers 530D, 535D, 540D, 545D on the PIC, and is then coupled to different locations on the moving target surface. These couplers 530D, 535D, 540D, 545D can be physically connected or separated.

Figure 8E:
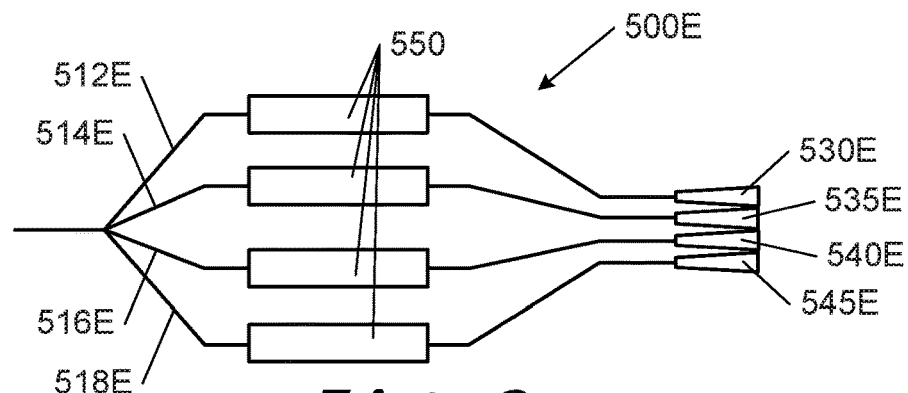

With an array of phase modulators, one can also scan the output angle of the measurement beam as shown in a fifth embodiment of a combined transmitting antenna and transmit scan unit 500E as shown in FIG. 8e. Here, the couplers 530E, 535E, 540E, 545E are close together and are smaller than the couplers illustrated in Figured 8a to 8d. This technique for scanning the output of the measurement beam is called beam steering.

If the measurement beam is not scanned, one can implement a similar design in the receiving antenna (not shown). Embodiments described with reference to FIGS. 8a to 8e can all be used in the receiving antenna. In this case, the reflections sent to different receiving couplers (or sent to the same receiving coupler but with different angles) are averaged out, therefore the speckle problems can also be mitigated. Meanwhile, scanning phase modulators may be provided in the transmitting antenna, although it is not essential to do so.

In this case, the couplers can be considered to be receiving antennas. For example, in FIG. 8a, the reflected light is sent back to the regions with couplers. The reflected light forms a speckle pattern at the plane of the couplers, and a bright speckle may be found at the coupler 530A or at the coupler 540A. Because more than one receive couplers is used, the chance that one bright speckle is captured becomes higher. The captured reflection signals at the two couplers are combined in the scanner 500A, which is modulated with a phase modulator 550. By changing the phase status of the modulator 550, the signal sent out of the combiner 510 to the single waveguide can be the reflection light from either 530A or 540A.

In FIGS. 8b and 8c, the scanner performs a similar function. The output signal to the single waveguide connected to combiner 510 does not correspond to only one coupler, but a combination of the signals from all couplers (e.g. 530B, 535B, 540B, 545B). By changing the status of the phase modulator 550, the weight factors of the combined signals can be changed. Therefore, the embodiments shown in FIGS. 8b and 8c work like a scanner for the receiving antennas.

The embodiment in FIG. 8d has more modulators 550 in the scanner, so it is possible to ensure that only the signal from one specific coupler is directed to the output waveguide, and, this specific coupler can be changed by changing the status of the modulators 550. The embodiment in FIG. 8e can scan the received light by picking up light with the different receiving directions.

Figure 9A:
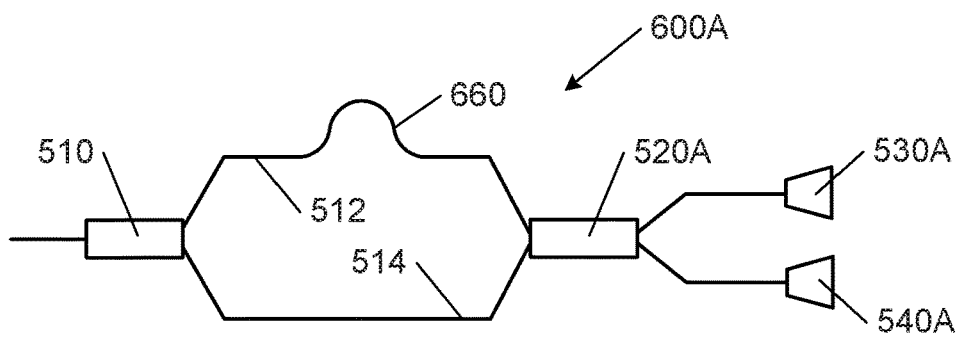
FIGS. 9a to 9e are schematic illustrations of possible configurations for a transmitting/receiving antenna in a photonic integrated circuit with optical delay, according to an example embodiment.
Figure 9B:
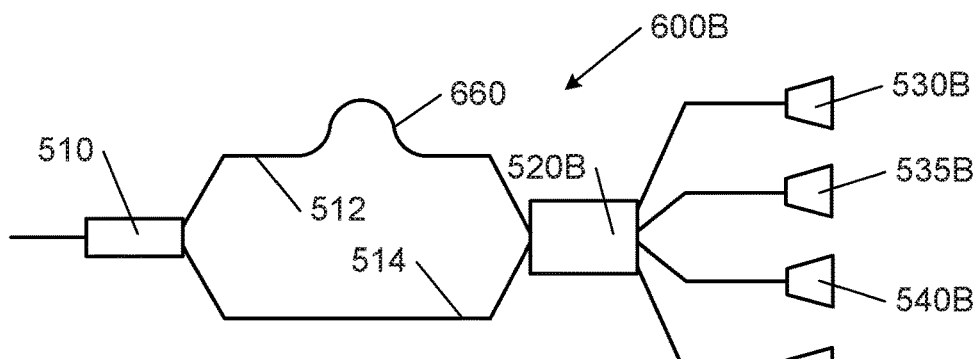
Figure 9C:
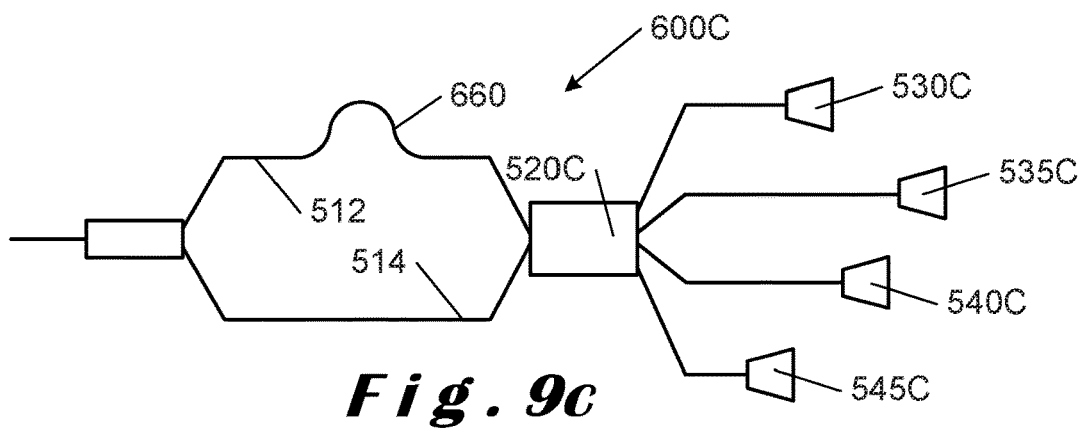

All the aforementioned scanning devices are based on fast phase modulators in the optical circuit. It is also possible to realize the scan by using a fast tunable laser together with a corresponding PIC implementations. PIC implementations 600A, 600B, 600C are shown in FIGS. 9a to 9c where only the fast phase modulator 550 of each of FIGS. 8a to 8c has been replaced by an optical delay line 660. In these implementations, an optical delay is provided between the two arms of the MZI, and, the distribution of the power in the output couplers can be controlled by modulating the wavelength of the input light.

Figure 9D:
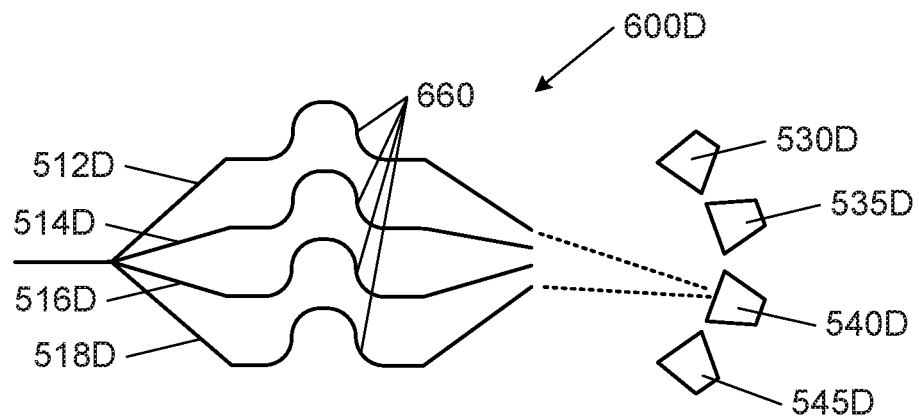

The output field distribution of an AWG can also vary as a result of wavelength change of the input light, and therefore, PIC implementation 600D, as shown in FIG. 9d is also possible. FIG. 9d is similar to FIG. 8d but with the fast phase modulators 550 being replaced with optical delay lines 660. Similarly, embodiment 600E of FIG. 9e is similar to FIG. 8e but with the fast phase modulators 550 being replaced with optical delay lines 660.

Figure 9E:
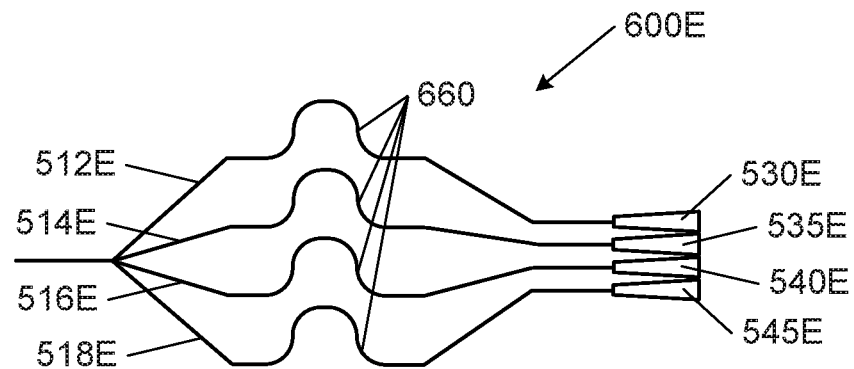

Wavelength-induced beam-steering can also be realized with an AWG structure as shown in FIG. 9e. In this implementation, an AWG is connected to an phased array grating coupler (PAGC), and, the optical delay of each waveguide in the AWG is implemented so that the light signals sent to the PAGC can be controlled by the input wavelength. As a result, the beam coupled out of the PAGC can be modulated. This implementation can be combined with the grating coupler for a two-dimensional scan.

The embodiments shown in FIGS. 9a to 9e can also be used for the receive scan, but the scan function only works when the wavelength of the light is modulated.

Figure 10:
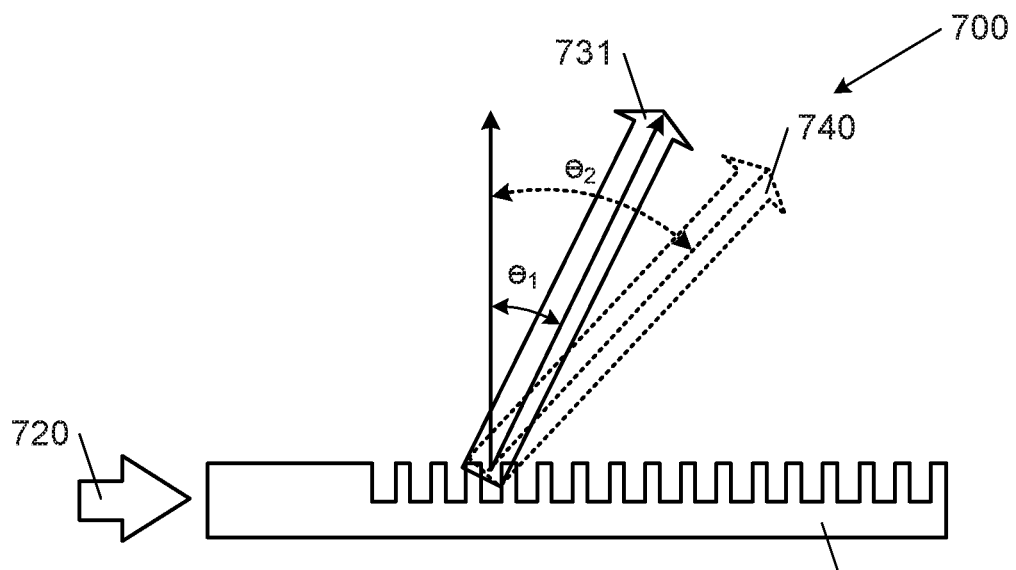
FIG. 10 is a schematic illustration of a transmitting antenna configuration using a grating coupler for beam steering, according to an example embodiment.

A transmit scan unit based on beam steering can also be realized with wavelength modulation. This can be implemented using a grating coupler 700 as shown in FIG. 10. In this embodiment, the output beam angle θ changes as a function of the light wavelength, and, a different wavelength corresponds to a different value of θ. As shown in FIG. 10, a grating 710 receives input light 720 from one or more coherent light sources having different wavelengths. Beams at different wavelengths can be produced at different angles in accordance with the grating 710. As shown, beam 731 is at an angle $\theta_1$ to a normal to the grating 710 and beam 740 is at an angle $\theta_2$ to a normal to the grating 710 in accordance with the wavelength of the input light.

Figure 11:
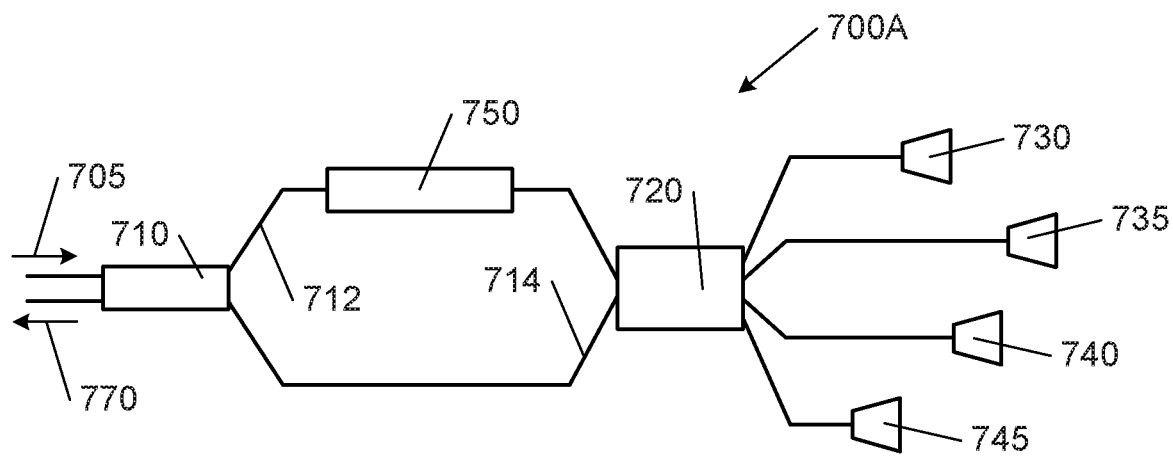
FIG. 11 is a schematic illustration of a combined transmitting/receiving antenna configuration, according to an example embodiment.
Figure 12:
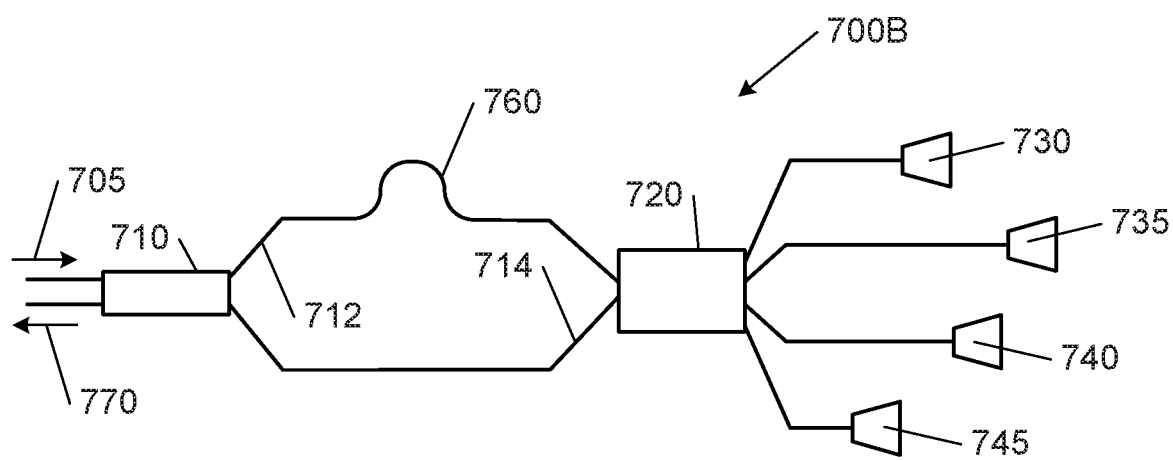
FIG. 12 is a schematic illustration of a combined transmitting/receiving antenna configuration with a wavelength-controlled scan, according to an example embodiment.

The transmitting antenna and the receiving antenna may be combined together as shown in FIGS. 11 and 12. FIG. 11 is similar to FIG. 8c with a first beamsplitter 710 dividing the light 705 into paths 712, 714 and recombining the reflected light on paths 712, 714. As with FIG. 8c, a fast phase modulator 750 is located in path 712 with a 2×4 splitter 720 combining the paths 712, 714 and dividing the combination into four and directing each of the four parts to respective ones of couplers 730, 735, 740, 745. FIG. 12 is similar to FIG. 11 but with the fast phase modulator 750 replaced by an optical delay 760.

Although the beamsplitter 710 is shown as a 50:50 or 1×2 splitter, it can be replaced by 2×2 splitter or 2×N splitter or even N×N splitter. In this case, one (or several) of the left ports can be used to send the reflected light to the combiner where it can be combined with the reference signal.

Figure 13:
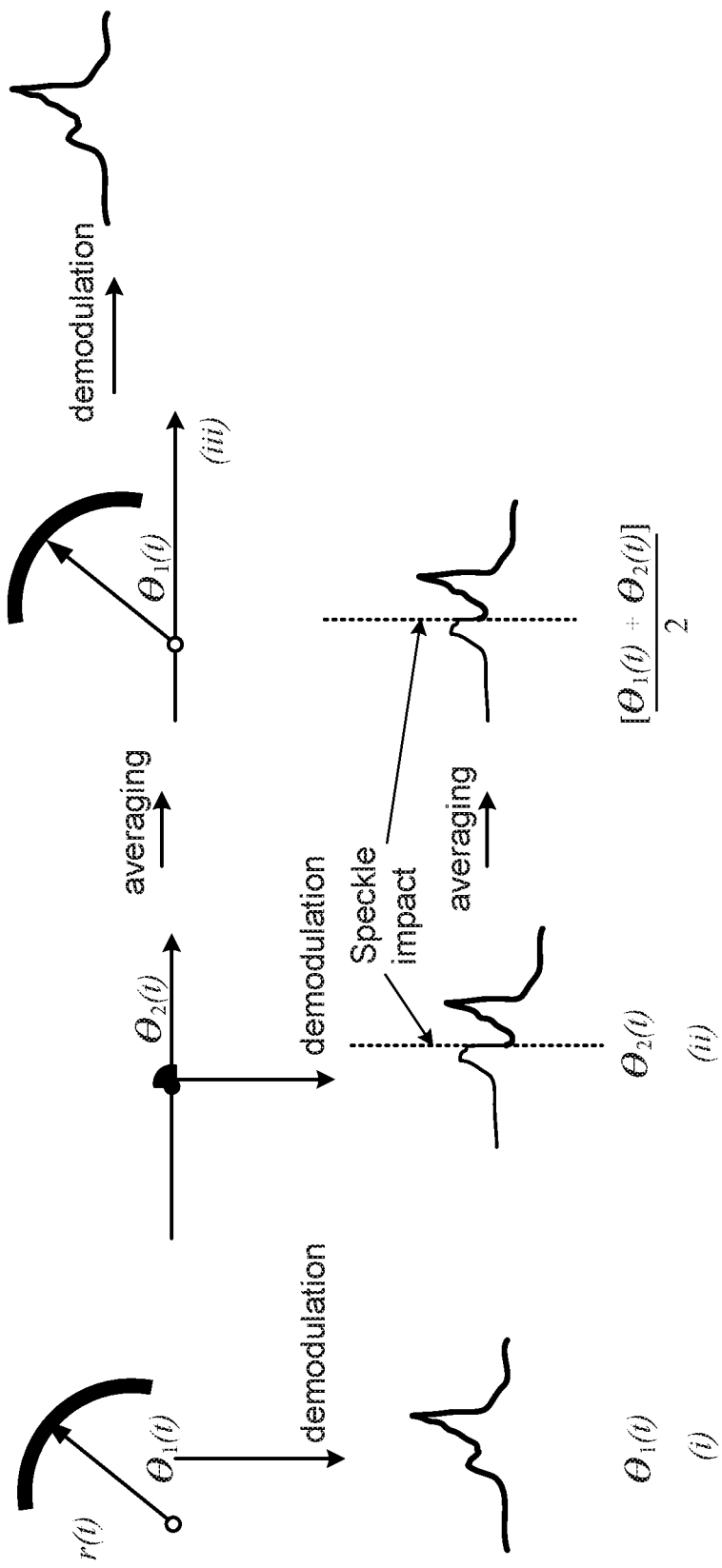
FIG. 13 illustrates the effect of averaging after demodulation when compared to averaging before demodulation, according to an example embodiment.

FIG. 13 illustrates the effect of averaging after or before post-processing, that is, demodulation.

In an ideal situation, with no speckle impact, the raw signal, shown at (i), should be post-processed or demodulated and provide a continuous output waveform with no discontinuities. The raw signal comprises two dimensional information:

$$[r(t), \theta(t)] \text{ or } [I(t), Q(t)]$$

As shown at (i), for [r(t), θ₁(t)] and after demodulation, only one dimensional information is left θ₁(t). This is the ideal situation.

One important speckle problem is due to the small value of r(t), which is dropped and not be considered after demodulation. However, r(t) is an important indicator to show the level of impact on a signal of speckle noise. A typical case is that the r(t) value is considerably reduced when the light beams reflected back to the receiving antenna have destructive interference. In this case, pseudo phase steps or discontinuities may exist in the demodulated signal θ₂(t) as a result of a low signal-to-noise ratio and non-linear demodulation process, as shown at (ii) where there is a phase step due to speckle impact. If demodulated output is then averaged as $$\frac{\theta_1(t) + \theta_2(t)}{2},$$

the discontinuities due to speckle impact are retained as shown.

If the averaging is done before demodulation as shown at (iii), the impact of I₂ and Q₂ in the averaging is small as the average is based on $$\left( \left[ \frac{I_1(t) + I_2(t)}{2} \right], \left[ \frac{Q_1(t) + Q_2(t)}{2} \right] \right).$$

As a result, the averaged signals can then be demodulated without apparent discontinuities.

The method of averaging before demodulation takes account of the weighting factor r(t) in the averaging. In contrast, the weighting factor r(t) is dropped in the methods that average after demodulation. This is the main reason why averaging before demodulation works better than averaging after demodulation.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method of mitigating effects of speckle in a laser-based sensor, the method comprising:
    generating at least one light beam from at least one coherent light source;
    splitting the at least one light beam into a first component and a second component;
    directing the first component of the at least one light beam to a transmitting antenna;
    transmitting the first component of the at least one light beam from the transmitting antenna towards a moving target surface, wherein transmitting the first component comprises scanning the at least one light beam over the moving target surface;
    receiving at least one reflected light beam from the moving target surface at a receiving antenna, wherein receiving the at least one reflected light beam comprises scanning the at least one reflected light beam onto the receiving antenna;
    combining the at least one reflected light beam with the second component of the at least one light beam to form at least one combined beam;
    converting the at least one combined light beam into at least one electrical signal; and
    processing the at least one electrical signal to derive an output signal indicative of motion of the moving target surface, wherein processing the at least one electrical signal comprises averaging the electrical signals corresponding to reflected beams and demodulating the averaged electrical signals.

2. The method according to claim 1, wherein receiving the at least one reflected light beam comprises receiving the reflected scanned beams from the moving target surface.

3. The method according to claim 1, wherein receiving the at least one reflected light beam comprises scanning the at least one reflected beam from the moving target surface (190) at the receiving antenna, and wherein transmitting the first component comprises transmitting the at least one light beam from the transmitting antenna to the moving target surface.

4. The method according to claim 1, wherein converting the at least one combined light beam into at least one electrical signal comprises detecting the at least one combined beam using a detector array, the electrical signals corresponding to the output from each detector element in the detector array.

5. The method according to claim 4, wherein converting the at least one combined light beam into at least one electrical signal further comprises reading out the electrical signals from the detector array.

6. The method according to claim 1, further comprising focusing at least one of: the transmitted light beam onto the moving target surface and the reflected light beam at the receiving antenna.

7. A laser-based sensor comprising:
    at least one coherent light source configured for generating at least one light beam;
    at least one splitter configured for splitting the at least one light beam into a first component and a second component;
    a transmitting antenna configured for receiving the first component of the at least one light beam from the at least one light source and for transmitting the first component of the at least one light beam to a moving target surface;

a receiving antenna configured for receiving at least one reflected light beam from the moving target surface;

a combiner configured for combining with the at least one reflected beam with the second component of the at least one light beam to form at least one combined beam;

a detector array configured for receiving the at least one combined beam from the combiner and for converting the at least one combined beam into at least one electrical signal;

at least one processor configured for processing the at least one electrical signal to derive an output signal indicative of motion of the moving target surface;

at least one of a transmit scan unit configured for scanning the first component of the at least one light beam over the moving target surface and a receive scan unit configured for scanning the at least one reflected beam onto the receiving antenna; and an averaging unit configured for averaging electrical signals corresponding to the at least one combined beam and for passing the averaged electrical signals to the at least one processor for demodulation.

8. The sensor according to claim 7, wherein the at least one coherent light source, the transmitting antenna, the receiving antenna, the detector array, and at least one of the scan transmit unit and the receive scan unit form part of a photonic integrated circuit.

9. The sensor according to claim 8, further comprising a driver circuit configured for driving the photonic integrated circuit.

10. The sensor according to claim 7, further comprising a readout electronics circuit configured for reading out the electrical signals from the detector array.

11. The sensor according to claim 7, further comprising an optical frequency shifter configured for shifting the frequency of at least one of the first component of the at least one light beam and the second component of the at least one light beam prior to combining with the at least one reflected beam.

12. The sensor according to claim 7, further comprising focusing optics configured for focusing at least one of the transmitted light beam onto the moving target surface and the reflected light beam at the receiving antenna.

13. A laser Doppler system including a sensor, wherein the sensor comprises:

at least one coherent light source configured for generating at least one light beam;

at least one splitter configured for splitting the at least one light beam into a first component and a second component;

a transmitting antenna configured for receiving the first component of the at least one light beam from the at least one light source and for transmitting the first component of the at least one light beam to a moving target surface;

a receiving antenna configured for receiving at least one reflected light beam from the moving target surface;

a combiner configured for combining with the at least one reflected beam with the second component of the at least one light beam to form at least one combined beam;

a detector array configured for receiving the at least one combined beam from the combiner and for converting the at least one combined beam into at least one electrical signal;

at least one processor configured for processing the at least one electrical signal to derive an output signal indicative of motion of the moving target surface;

at least one of a transmit scan unit configured for scanning the first component of the at least one light beam over the moving target surface and a receive scan unit configured for scanning the at least one reflected beam onto the receiving antenna; and an averaging unit configured for averaging electrical signals corresponding to the at least one combined beam and for passing the averaged electrical signals to the at least one processor for demodulation.

* * * * *